Sept. 13, 1966          H. HARDY          3,272,903

METHOD FOR MAKING SHOES

Filed Nov. 12, 1963

INVENTOR.
Henry Hardy
BY
Roberts, Cushman & Grover
ATT'YS

United States Patent Office 3,272,903
Patented Sept. 13, 1966

3,272,903
METHOD FOR MAKING SHOES
Henry Hardy, Cambridge, Mass., assignor to International Vulcanizing Corporation, Boston, Mass., a corporation of Massachusetts
Filed Nov. 12, 1963, Ser. No. 322,749
6 Claims. (Cl. 264—244)

This application is a continuation-in-part of my copending application Serial No. 5,246, filed January 28, 1960, and now abandoned, and relates to the manufacture of shoes and more especially to attaching a moldable bottom-forming composition to the bottom of an upper by means of pressure and/or heat.

It is conventional to hold a lasted upper engaged with the open top of a bottom-forming mold having a fixed bottom and to inject a liquid bottom-forming composition through an opening in the mold to fill the mold cavity beneath the lasted upper, thus to mold the bottom to the desired dimensions at the same time that it is attached to the bottom of the upper. In order to lessen the undesirable effects of shrinkage, it is customary to inject the bottom-forming composition at as high a pressure as possible however such procedure is limited by the seal which may be maintained between the bottom of the upper and the top of the mold without damage to the upper. If not enough pressure is applied, the liquid bottom-forming composition will squirt out around the shoulder of the last and if too much pressure is applied the upper is damaged and will split along the shoulder. In some instances as high pressure has been employed as is possible without damage to the upper and injection is automatically terminated by the unseating of the last in an amount too small to permit escape of the bottom-forming composition. However not enough bottom-forming composition can be injected in this fashion to entirely eliminate the undesirable effects of shrinkage and the pressure is not high enough to insure a satisfactory adhesion of the bottom to the upper.

The objects of this invention are to provide a method of substantially eliminating the undesirable effects of change in the volume of the bottom-forming composition after it has been applied to the bottom whether such change be a shrinkage or an expansion; to avoid damage to the upper by the application of too much pressure during application of the bottom-forming composition to the upper without loss of material and without formation of flash; to insure formation of a permanent bond between the bottom-forming composition and the upper.

In accordance with the foregoing, the method of attaching a shoe bottom of predetermined thickness to an upper, as herein illustrated, comprises providing a mold having an open top, a side wall of the precise transverse dimensions of the bottom to be formed and a movable bottom wall, supporting a lasted upper with its bottom against the open top of the mold and with the bottom of the mold at a predetermined distance therefrom, yieldably opposing relative movement between the bottom of the upper and the mold bottom and injecting bottom-forming composition into the mold between the bottom of the upper and the mold bottom; characterized in terminating injection before relative movement of the mold and lasted upper ceases but when just sufficient of the liquid bottom-forming composition has been injected to form a completed sole of the desired thickness, applying compacting pressure and maintaining said compacting pressure until transformation of the liquid bottom-forming composition to solid is completed. When the liquid bottom-forming composition is of the kind that shrinks during transformation from its liquid to its solid form, injection is terminated when the volume contained by the mold is such that the thickness is greater than the predetermined thickness of the bottom which is to be attached by the amount of expected shrinkage. When the bottom-forming composition is of the kind that expands or is provided with an expander, injection is terminated when the volume contained by the mold is such that the thickness is less than the predetermined thickness of the bottom which is to be attached by the amount of the expected expansion. Preferably the injection is terminated by the relative movement of the mold bottom and the lasted upper. During injection relative movement between the bottom of the upper and the mold bottom is resisted by pressure of approximately 35–50 pounds per square inch. Following injection and cut off an increased attaching pressure is applied in the order of 75–100 pounds per square inch.

This method of applying bottoms to shoes contemplates the attachment of bottoms to uppers comprised of leather, artifical leather and textile materials such as woven, knitted or felted fabrics, and it is to be understood that uppers comprised of any of the foregoing materials may include linings, stiffening materials at the heel end or toe, and may be string-lasted or lasted to an insole.

The apparatus employed comprises an open top mold having the precise transverse dimensions of the bottom to be attached to the upper, a movable bottom part and a last supported for engagement with the open top of the mold. The last and mold are supported for relative movement and there is means yieldably opposing such relative movement up to a predetermined injection pressure whereupon relative movement will take place upon continued injection. Injection is provided for by a conventional injection apparatus having a nozzle adapted to be brought into engagement with a sprue in a wall of the mold. The injection apparatus is driven by a motor, there is a starting switch for starting the motor to initiate injection and a microswitch adjustably mounted adjacent the mold operable, by relative movement of the last and mold, to stop the motor and hence terminate injection. The switch is adapted to be located in a position to terminate injection when just enough bottom-forming composition has been injected to compensate either for the expected shrinkage or for the expected expansion. The bottom part of the mold is normally supported by a spring which resists displacement until the mold is completely filled and a pressure-operable motor is connected to the bottom part for applying a bottom-attaching pressure to the injected bottom-forming composition following injection and for maintaining the increased pressure while the bottom-forming composition is changing from liquid to solid. A timing device, such as a thermal switch, is operative, following termination of injection, to supply high pressure fluid to the motor to apply the bottom-attaching pressure.

The invention will now be described in greater detail with reference to the accompanying drawings wherein.

Figure 1:
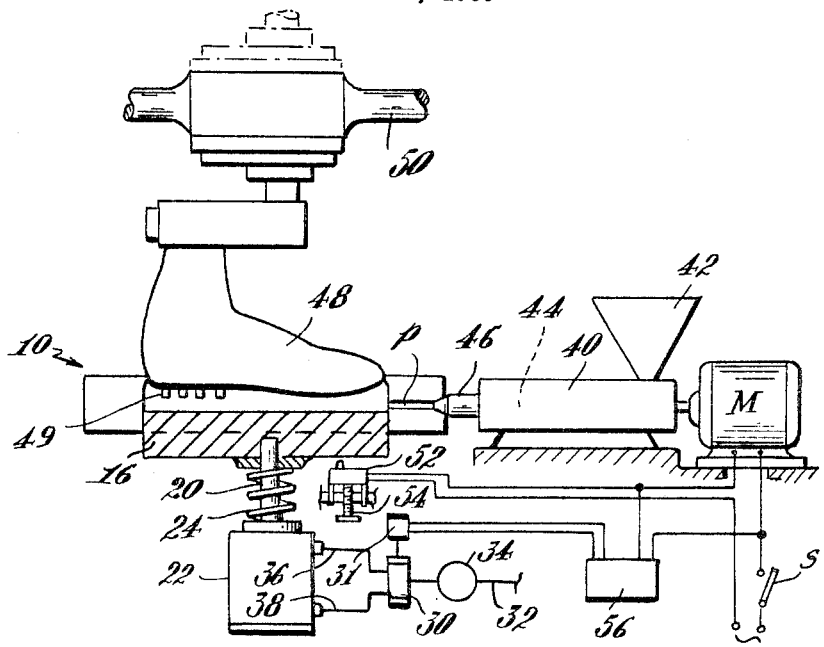
FIG. 1 is an elevation of one unit of a bottom-applying apparatus having a plurality of such units, by means of which the method described hereinafter may be carried out.
Figure 2:
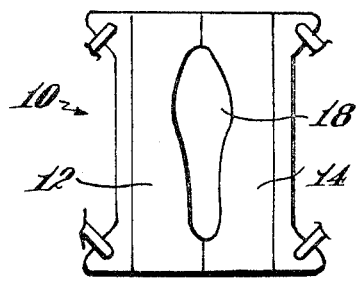
FIG. 2 is a plan view of the bottom-forming mold.

Referring to the drawings, there is shown a mold 10 comprised of left and right-hand sections 12 and 14 and a bottom part 16 supported, as disclosed in Patent No. 2,878,523, dated March 24, 1959, for movement of the sections 12 and 14 into engagement with the bottom part 16 to provide a mold cavity 18 which is open at the top and which is of variable depth. The bottom part 16 of the mold is secured to the upper end of a piston rod 20 protruding from a cylinder 22 which may be supplied with a pressure fluid such as oil or air to raise the bottom relative to the sides and thus to vary the depth of the mold cavity. The cylinder 22 is fixed to the frame of the apparatus and a coiled spring 24 is disposed about the piston rod 20 with one end bearing against the upper end of the cylinder 22 and the other against the underside of the bottom part 16 so that normally the bottom part is yieldably held at a predetermined level by the spring 24 in the absence of pressure supplied to the cylinder 22.

Fluid pressure is supplied to the opposite ends of the cylinder 22 through conductors 36 and 38 by way of a solenoid-operated valve 30 which is connected to a source of fluid pressure by a conductor 32 containing a regulator valve 34. The solenoid 31 is in a circuit which includes a motor M for driving an injector. The circuit also contains a starting switch S which, when closed, initiates a cycle of operation by starting the motor M of the injector. As herein illustrated, the injector comprises a heated barrel 40 to which the bottom-forming composition is supplied through a hopper 42 and from which the liquid bottom-forming composition is forced by a transfer device 44, herein shown as a screw, through a nozzle 46 which is held engaged with an injection passage p through one of the walls of the mold.

The last 48, upon which the upper is mounted, is supported for engagement with the open top of the mold by means of a horizontally disposed shaft 50 which is rotatable, as disclosed in the aforementioned patent, and vertically movable relative to the mold to bring one or the other of two of such lasts, mounted diametrically opposite each other on the shaft, into a position opposite the mold and then to lower it into engagement with the mold.

A microswitch (double-pole) 52 is mounted below the movable bottom part 16 in a position to be actuated by downward movement of the bottom part and is adjustable heightwise by a screw 54 so as to be operable in response to different displacements of the bottom part 16. The microswitch 52 is connected into the circuit so that when it is actuated it will stop the motor M and start a time delay switch, for example a simple bimetallic thermal switch 56, to energize the solenoid 31 so as to supply pressure to the lower end of the cylinder 22 and thereby to apply increased pressure to the material injected between the mold bottom and the bottom of the lasted upper. A delay of a few seconds is sufficient.

The method as practiced with the foregoing apparatus comprises first lowering one of the lasts 48, with an upper mounted thereon, into engagement with the open top of the mold, the halves of which have been previously brought together about the bottom part, the latter being held at a position determined by the uncompressed spring 24. The distance between the bottom of the lasted upper and the bottom part of the mold at this stage is slightly less than the thickness of the bottom which is to be applied. The starting switch S is now closed and injection commences and continues until the mold cavity 18 is filled and the injection pressure begins to move the bottom part 16 downwardly relatively to the bottom of the lasted upper. If the bottom-forming composition is of the kind that shrinks during transformation from its liquid to its solid state, the microswitch 52 is adjusted heightwise relative to the bottom part 16 so that the bottom part 16 will continue to be displaced downwardly to a position in which the mold cavity will contain enough bottom-forming composition so that, when it subsequently shrinks, the final thickness will correspond substantially exactly to the desired thickness of the bottom to be attached to the upper. The adjustment of the microswitch 52 is determined by trial and error and, when actuated, stops the motor M. A delay (depending upon the character of the bottom-forming composition) of a few seconds, following termination of injection, is provided by the thermal switch 56, whereup high pressure fluid is supplied to the cylinder 22 to raise the bottom 16 and to apply a pressure of 75–100 pounds per square inch, to press the bottom-forming composition into intimate contact with the bottom of the upper. This increased pressure is maintained throughout transformation of the bottom-forming composition from its liquid phase to its solid phase. A timing device may be provided for bringing the cycle to an end.

In the event that the bottom-forming composition is of the kind which expands during transformation from its liquid to its solid phase or contains an expander, injection is terminated when the mold contains a volume which is less than that required to provide the thickness desired by the amount of expected expansion. This is obtained by trial and error and setting the microswitch 52 in accordance therewith, at a heightwise position such that, when the bottom part 16 engages the switch, the mold will contain a volume which, when expanded, will provide the thickness desired.

During the injection of the bottom-forming composition a pressure of approximately 35–50 pounds is employed to hold the bottom 16 against downward displacement relative to the bottom of the lasted upper and this is afforded by choosing a spring 24 of suitable resistance to pressure. Equivalent means could be used for this purpose, for example a pressure cylinder might be employed operable, at a low pressure, to support the bottom element 16 in opposition to displacement. The initial low pressure during injection insures complete filling of the mold before termination and is sufficient to prevent escape of the bottom-forming composition but not high enough to damage the upper. The pressure applied following termination of injection is sufficiently high to nullify voids in the cases of shrinkage and is maintained throughout the transformation from liquid to solid phase in the order of 75–100 pounds per square inch so as to hold the bottom-forming composition in such intimate contact with the bottom of the upper as to insure a permanent bond.

As has been previously pointed out, bottoms may be attached in this fashion to uppers of various kinds, for example leather, imitation leather and textile fabrics of woven, knitted or felted manufacture. The uppers may include linings and/or stiffeners and may be applied to the last by conventional lasting methods including an insole or by string-lasting which is especially suitable for use with fabric uppers in which an insole is not employed.

Figure 3:
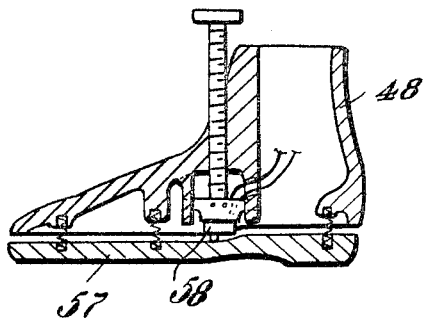
FIG. 3 is a section of a modified form of last for supporting an upper in contact with the mold.

Instead of employing the displacement of the bottom of the mold for effecting operation of the microswitch for terminating injection, the bottom of the last, as shown in FIG. 3, may be provided with a yieldable part 57, upward displacement of which will actuate a microswitch 58 for terminating injection. When using this structure the position of the microswitch may be adjusted so that when a volume is injected of sufficient amount to take care of the shrinkage, the yieldable part 57 will contact the microswitch and terminate injection. By repositioning the microswitch, it may be actuated by contact of the part 57 when the latter is in a position relative to the bottom of the mold such that the mold will accommodate just enough of the bottom-forming composition so that, when it expands during setting, the final thickness will correspond to that which is desired. When using a last of this kind the compacting pressure is applied by moving the bottom part upwardly in the mold as heretofore explained.

Figure 4:
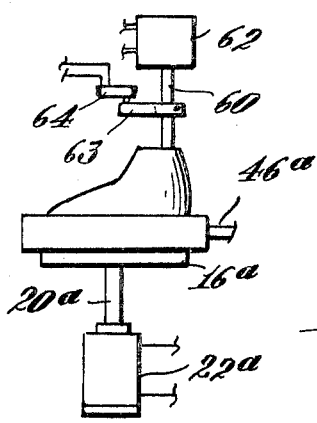
FIG. 4 diagrammatically illustrates a modification of the apparatus in which the lasted upper is yieldably held against the bottom mold.

Alternatively, a structure such as shown in FIG. 4 may be used in which the bottom of the mold 16a is movable vertically between the mold halves by a rod 20a protruding from the upper end of the cylinder 22a, and the lasted upper is supported in engagement with the open top of the mold by the lower end of a rod 60 protruding from a cylinder 62. In this form, pressure fluid is supplied to the upper end of the cylinder 62 to yieldingly hold the lasted upper in engagement with the top of the mold at a predetermined pressure of approximately 35–50 pounds per square inch. Bottom-forming composition is injected into the mold between the bottom of the lasted upper and the movable bottom of the mold through a nozzle 46a of an injection apparatus, as previously explained, while the bottom part 16a is held fixed. An adjustably supported microswitch 64 is supported adjacent the rod 60 so that upward displacement of the lasted upper will actuate the microswitch 64 and terminate injection by shutting off the motor M. Following termination of injection, the pressure fluid is supplied to the cylinder 22a to apply an attaching pressure as previously explained. An equal and opposite pressure is applied to the last by increasing the pressure in the cylinder 62 to that supplied to the cylinder 22a. By adjusting the position of the microswitch 64 or an adjustable actuator 63 secured to the rod 60, the method can be performed either to apply a bottom-forming composition which shrinks or one which expands.

The mold parts and the last may be heated or cooled and provided with means for increasing the rate of heat transfer either to increase the temperature or decrease the temperature from the last or mold to the bottom-forming composition or from the bottom-forming composition to the last and mold parts to expedite setting or curing according to the character of the bottom-forming composition. Thus, as illustrated in the aforesaid patent, pins 49, or the like, may be secured to or formed integral with the bottom of the last at the heel end as shown herein, and also to the forepart, if desired, of suitable length which will be determined by the thickness of the bottom at the heel end and forepart.

As related above, this invention has as its primary objects to provide applying a liquid bottom-forming composition to the bottom of a last upper by applying just the right amount of liquid composition under an initial low pressure to insure formation of a bottom of the desired thickness, whether the composition expands or shrinks during transformation from its liquid to its solid phase and, after the correct amount has been applied, of increasing the pressure to apply an attaching pressure throughout the change from liquid to solid to insure a permanent bond between the bottom and the upper.

It should be understood that the present disclosure is for the purpose of illustration only and that this invention includes all modifications and equivalents which fall within the scope of the appended claims.

I claim:
1. The method of attaching a shoe bottom of predetermined thickness to an upper comprising as steps: providing a mold having an open top and comprising a side wall defining a space of the precise transverse shape and dimensions of the shoe bottom to be formed and a movable bottom wall, supporting a lasted upper with its bottom in registry with the open top of the mold and with the bottom of the mold at a predetermined distance therefrom, yieldably opposing relative movement between the bottom of the upper and the mold bottom, injecting a liquid bottom-forming composition into the mold between the bottom of the upper and the mold, employing the displacement of the bottom wall as the elastomer is injected to terminate injection when the volume of elastomer injected is such that upon transformation from liquid to solid it will form a bottom of said predetermined thickness, applying added pressure to the sole plate following termination of injection and maintaining said added pressure until transformation of the liquid to solid is completed.

2. The method of attaching shoe bottoms comprising, supporting the bottom of the upper in engagement with the open top of the mold, having a side wall corresponding precisely to the transverse dimension of the bottom to be formed and a movable bottom part, injecting a liquid bottom-forming composition into the mold beneath the bottom of the upper in a predetermined amount such that upon transformation of the liquid to solid, it will form a bottom of predetermined thickness, maintaining a predetermined resistance to displacement of the bottom of the upper and the mold part during injection but allowing displacement of the mold part to receive the predetermined amount, terminating injection when said predetermined amount of bottom-forming composition has been received by such further displacement beyond that required to contain said predetermined amount, applying an increased pressure between the injected composition and the upper, and maintaining said pressure until the liquid bottom-forming composition changes from liquid to solid.

3. The method of making shoes which comprises, supporting the bottom of the upper in engagement with the open top of the mold, having a side wall corresponding precisely to the transverse dimension of the bottom to be formed and a movable bottom wall, applying pressure to the lasted upper and bottom wall yieldingly to hold the same at a lesser spacing than the thickness of the bottom to be attached to the shoe, injecting bottom-forming composition into the mold to force the shoe and bottom of the mold apart by an amount exceeding the predetermined thickness of the bottom to be attached by the amount of expected shrinkage of the liquid during change from liquid to solid, employing said movement to terminate injection, applying a bottom-attaching pressure of an increased amount to the bottom after termination of injection, and maintaining said increased pressure until the transformation is completed.

4. The method of attaching a shoe bottom of predetermined thickness to an upper comprising, providing a mold having an open top, a side wall of the precise transverse dimensions of the bottom to be formed and a movable bottom wall, supporting a lasted upper with its bottom in registry with the open top of the mold and with the bottom of the mold at a predetermined distance therefrom, yieldably opposing relative movement between the bottom of the upper and the mold bottom by a predetermined relatively low first pressure, injecting bottom-forming composition into the mold between the bottom of the upper and the mold bottom; characterized by terminating injection when the volume contained by the mold is just enough to compensate for the expected change in thickness of the bottom during transformation from liquid to solid, maintaining the first pressure for a predetermined period of time to permit incipient transformation from liquid to solid, applying an increased second pressure to hold the bottom in intimate bottom-attaching contact with the upper, and maintaining said increased pressure until transformation is completed.

5. A method according to claim 4, characterized in that the first pressure is in the order of 35–50 pounds per square inch.

6. A method according to claim 4, wherein the second pressure is in the order of 75–100 pounds per square inch.

References Cited by the Examiner

UNITED STATES PATENTS

| | | |
|---|---|---|
| 975,309 | 11/1910 | Wren et al. |
| 2,373,201 | 4/1945 | Smith. |
| 2,878,523 | 3/1959 | Hardy _____ 264—244 |
| 2,937,405 | 5/1960 | Berggren et al. |
| 3,012,278 | 12/1961 | Szerszynski. |
| 3,018,517 | 1/1962 | Ludwig. |
| 3,044,118 | 7/1962 | Bernhardt _____ 264—328 X |

ROBERT F. WHITE, *Primary Examiner.*

L. S. SQUIRES, *Assistant Examiner.*